United States Patent
Li et al.

(10) Patent No.: US 6,701,040 B2
(45) Date of Patent: Mar. 2, 2004

(54) DENSE WAVELENGTH DIVISION MULTIPLEXER CONFIGURATION

(75) Inventors: Yiqiang Li, San Jose, CA (US); Yongjian Wang, Saratoga, CA (US)

(73) Assignee: AC Photonics, Inc., Santa Clara, CA (US)

( * ) Notice: Subject to any disclaimer, the term of this patent is extended or adjusted under 35 U.S.C. 154(b) by 22 days.

(21) Appl. No.: 10/021,371

(22) Filed: Oct. 30, 2001

(65) Prior Publication Data

US 2003/0072527 A1 Apr. 17, 2003

Related U.S. Application Data

(60) Provisional application No. 60/329,606, filed on Oct. 15, 2001.

(51) Int. Cl.[7] .............................................. G02B 6/293
(52) U.S. Cl. .............................. 385/34; 385/33; 385/24; 385/47
(58) Field of Search .............................. 385/33, 34, 35, 385/38, 39, 27, 24, 47, 48

(56) References Cited

U.S. PATENT DOCUMENTS

| | | | | |
|---|---|---|---|---|
| 5,905,827 A | * | 5/1999 | Naganuma et al. .......... 385/31 |
| 5,917,626 A | * | 6/1999 | Lee .............................. 359/131 |
| 6,185,347 B1 | * | 2/2001 | Zheng .......................... 385/34 |
| 6,198,858 B1 | * | 3/2001 | Pan et al. ...................... 385/24 |
| 6,246,813 B1 | * | 6/2001 | Zheng .......................... 385/34 |
| 6,343,166 B1 | * | 1/2002 | Hellman et al. ............... 385/31 |
| 6,469,847 B1 | * | 10/2002 | Fan et al. ..................... 359/885 |
| 2002/0071630 A1 | * | 6/2002 | Su et al. ....................... 385/24 |

FOREIGN PATENT DOCUMENTS

| JP | 2002072009 A | * | 3/2002 | ........... G02B/6/293 |
|---|---|---|---|---|
| WO | WO 02/42816 A2 | * | 5/2002 | |

* cited by examiner

*Primary Examiner*—Hemang Sanghavi
*Assistant Examiner*—Scott A Knauss
(74) *Attorney, Agent, or Firm*—Sawyer Law Group LLP

(57) ABSTRACT

A method and system for providing a dense wavelength division multiplexer is disclosed. The method and system include providing a dual fiber collimator, a filter and a filter holder. The dual fiber collimator includes a lens and a capillary. The capillary is for holding a plurality of fibers. The filter holder has an aperture therein. The filter is disposed between the dual fiber collimator and the filter holder. The filter has a first surface and a second surface opposite to the first surface. The first surface is covered with a filter coating. The filter is affixed to the filter holder by the second surface.

15 Claims, 6 Drawing Sheets

DENSE WAVELENGTH DIVISION MULTIPLEXER CONFIGURATION

CROSS-REFERENCE TO RELATED APPLICATION

This application is claiming under 35 USC 119(e) the benefit of provisional patent Application Ser. No. 60/329,606 filed on Oct. 15, 2001.

FIELD OF THE INVENTION

The present invention relates to optical systems, and more particularly to a method and system for providing a dense wavelength division multiplexer.

BACKGROUND OF THE INVENTION

To meet the increasing demand for information transmission capacity, multiple wavelength transmission is required. Dense wavelength division multiplexers (DWDMs) are used in optical systems for functions of combining or separating optical signals with densely packed wavelengths. A thin file filter (TFF) and a micro-optics based DWDM can fulfill such a requirement and usually provide good optical performance and environmental stability.

FIG. 1 depicts a conventional DWDM 10. The conventional DWDM 10 includes a filter 12 having a filter coating surface 14, a graduated index (GRIN) lens 16, a glass tube 18 holding a dual fiber capillary 20 with fibers 24 and 26 and a surrounding metal tube 22. The conventional DWDM 10 also includes a single fiber collimator 30 with a fiber 31. The fiber 24 provides an input optical signal, which is collimated by the GRIN lens 16 and provided to the filter 12, which transmits the optical signal with desired wavelength and reflects the remainder of the optical signal containing all other wavelengths. The single fiber collimator 30 receives the transmitted, filtered optical signal and couples this optical signal into fiber 31. The reflected optical signal is focused by GRIN lens 16 and coupled back to fiber 26. Thus, the conventional DWDM 10 can be used to separate out a portion, such as one or several wavelengths, of the optical signal input to the conventional DWDM 10.

Although the conventional DWDM 10 functions, one of ordinary skill in the art will readily recognize that the conventional DWDM has several drawbacks. First, the filter 12 is attached to the GRIN lens 16 at the filter coating surface 14. Typically, the filter 12 is attached to the GRIN lens 16 using UV epoxy 15 to form a filter/GRIN assembly, which is further attached with dual fiber capillary 20 using UV epoxy 17. Because the filter 12 is attached to the GRIN lens 16 at the filter coating surface, mechanical stress can be introduced into the coating by the epoxy curing process. As a result, the properties of the filter, such as the center wavelength, the bandwidth and the band shape are changed. Thus, these properties of the conventional DWDM 10 can be altered. This makes the conventional DWDM of less use in applications where the channel spacing is very narrow, such as 50 or 25 GHz. The conventional DWDM 10 is, therefore, not suitable for use with such densely packed optical signals.

In addition to being unable to be used for dense optical signals, the conventional DWDM 10 may also be unreliable in higher temperature and/or higher humidity environments. As discussed above, the filter 12 is affixed to the GRIN lens 16 using an UV epoxy 15. The assembly made from the GRIN lens 16/filter 12 and dual fiber capillary 20 are also affixed using UV epoxy 17. Such an epoxy is prone to softening in high temperature and/or high humidity environments. When the UV epoxy 15 and 17 softens, the dual fiber capillary 20, the GRIN lens 16 and filter 12 may move with respect to each other. As a result, the optical alignment critical to the functioning of the conventional DWDM 10 is compromised. Thus, the conventional DWDM 10 becomes unreliable in such environments.

Accordingly, what is needed is a system and method for providing a DWDM that is more reliable and suitable for dense optical signals. The present invention addresses such a need.

SUMMARY OF THE INVENTION

The present invention provides a method and system for providing a dense wavelength division multiplexer. The method and system include providing a dual fiber collimator, a filter and a filter holder. The dual fiber collimator includes a lens and a capillary. The capillary is for holding a plurality of fibers. The filter holder has an aperture therein. The filter is disposed between the dual fiber collimator and the filter holder. The filter has a first surface and a second surface opposite to the first surface. The first surface is covered with a filter coating. The filter is affixed to the filter holder by the second surface.

According to the system and method disclosed herein, the present invention provides a dens wavelength division multiplexer suitable for use with optical signals with densely packed wavelengths.

DETAILED DESCRIPTION OF THE INVENTION

The present invention relates to an improvement in optical systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a dense wavelength division multiplexer (DWDM). The method and system include providing a dual fiber collimator, a filter and a filter holder. The dual fiber collimator includes a lens and a capillary. The capillary is for holding a plurality of fibers. The filter holder has an aperture therein. The filter is disposed between the dual fiber collimator and the filter holder. The filter has a first surface and a second surface opposite to the first surface. The first surface is covered with a filter coating. The filter is affixed to the filter holder by the second surface.

The present invention will be described in terms of a particular DWDM having certain components. However, one of ordinary skill in the art will readily recognize that this method and system will operate effectively for other DWDMs having other and/or additional components not inconsistent with the present invention. The present invention will also be described in the context of a DWDM, however, one of ordinary skill in the art will readily recognize that the present invention can be used with optical signals that are or are not densely packed. However, the present invention does find particular utility for dense optical signals.

Figure 1:
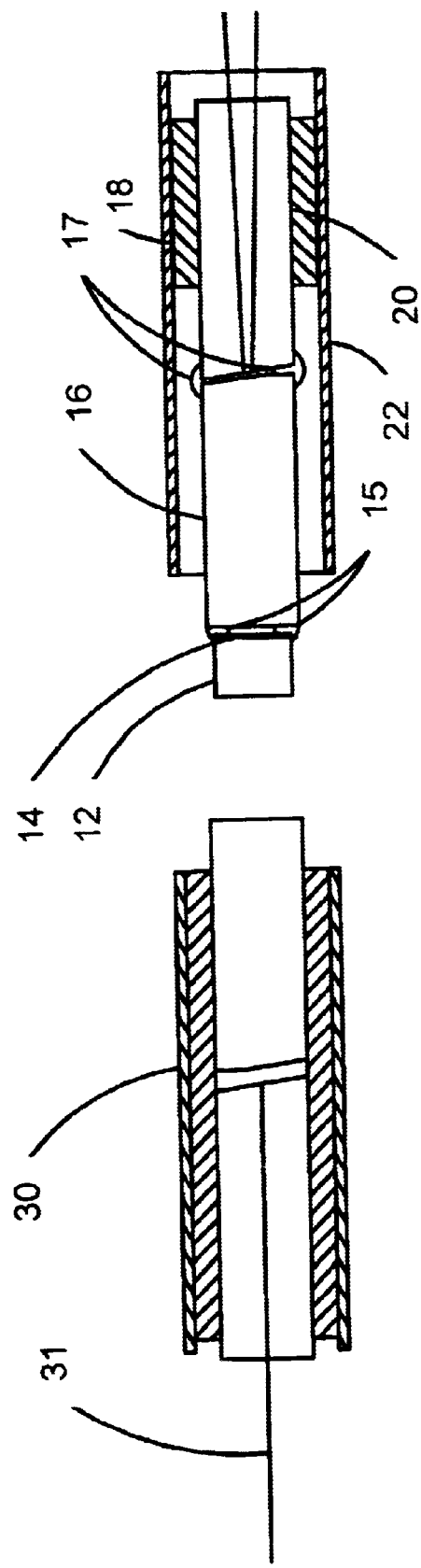
FIG. 1 is a diagram of a conventional dens wavelength division multiplexer.
Figure 2:
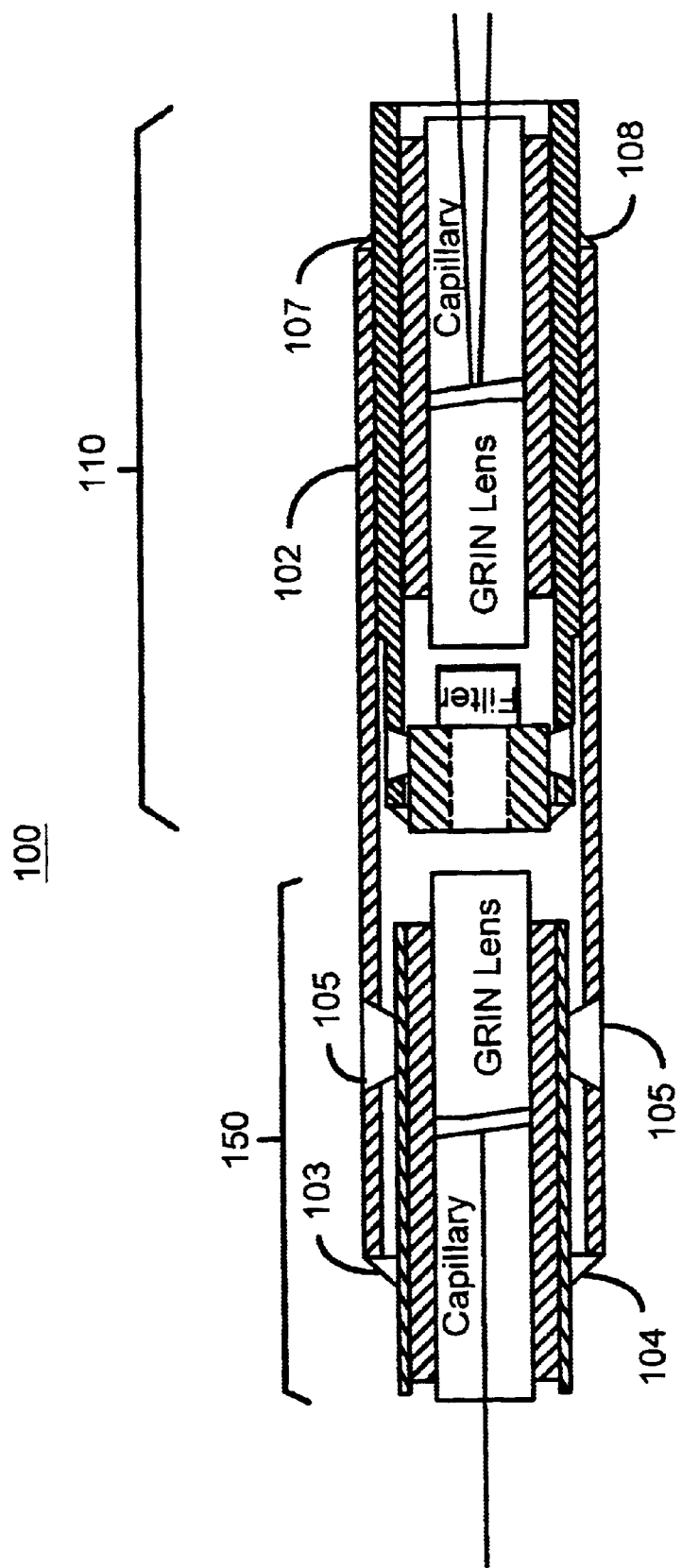
FIG. 2 depicts one embodiment of a dense wavelength division multiplexer in accordance with the present invention that is capable of being used with dense optical signals.

To more particularly illustrate the method and system in accordance with the present invention, refer now to FIG. 2, depicting one embodiment of a DWDM 100 in accordance with the present invention. The DWDM 100 includes a dense wavelength division multiplexer (DWDM) unit 110, a single fiber collimator 150 and a holder 102. The holder 102 is preferably metal and holds and aids in aligning the single fiber collimator 150 and the DWDM unit 110. The holder 102 is preferably tube shaped and is thus termed a soldering tube 102. The DWDM unit 110, and the single fiber collimator 150 are affixed to the soldering tube 102 using solder joints 103, 104, 105, 106, 107 and 108.

Figure 3:
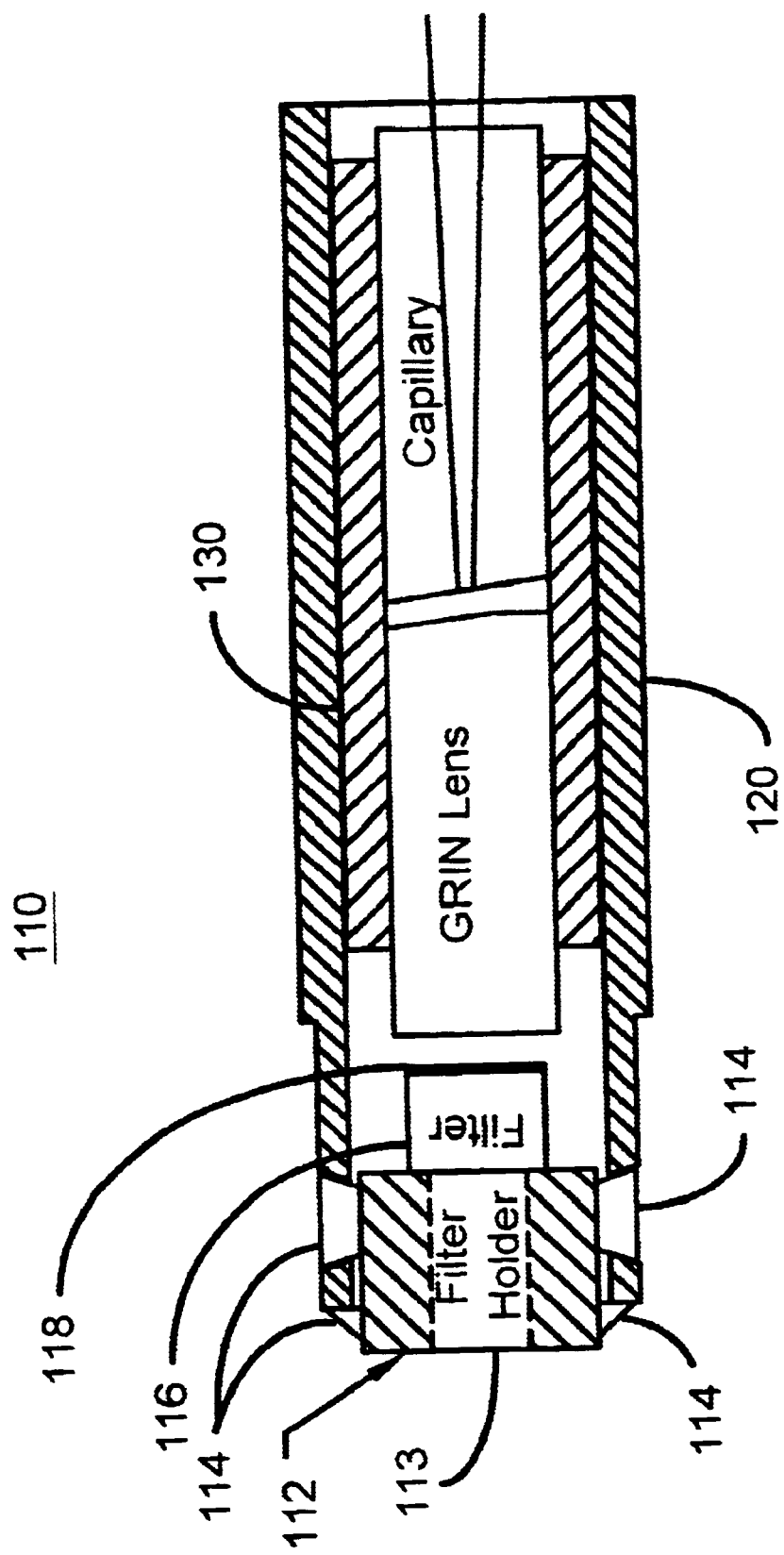
FIG. 3 is a diagram depicting one embodiment of a dense wavelength division multiplexer unit in accordance with the present invention that is capable of being used with optical signals with densely packed wavelengths.
Figure 4:
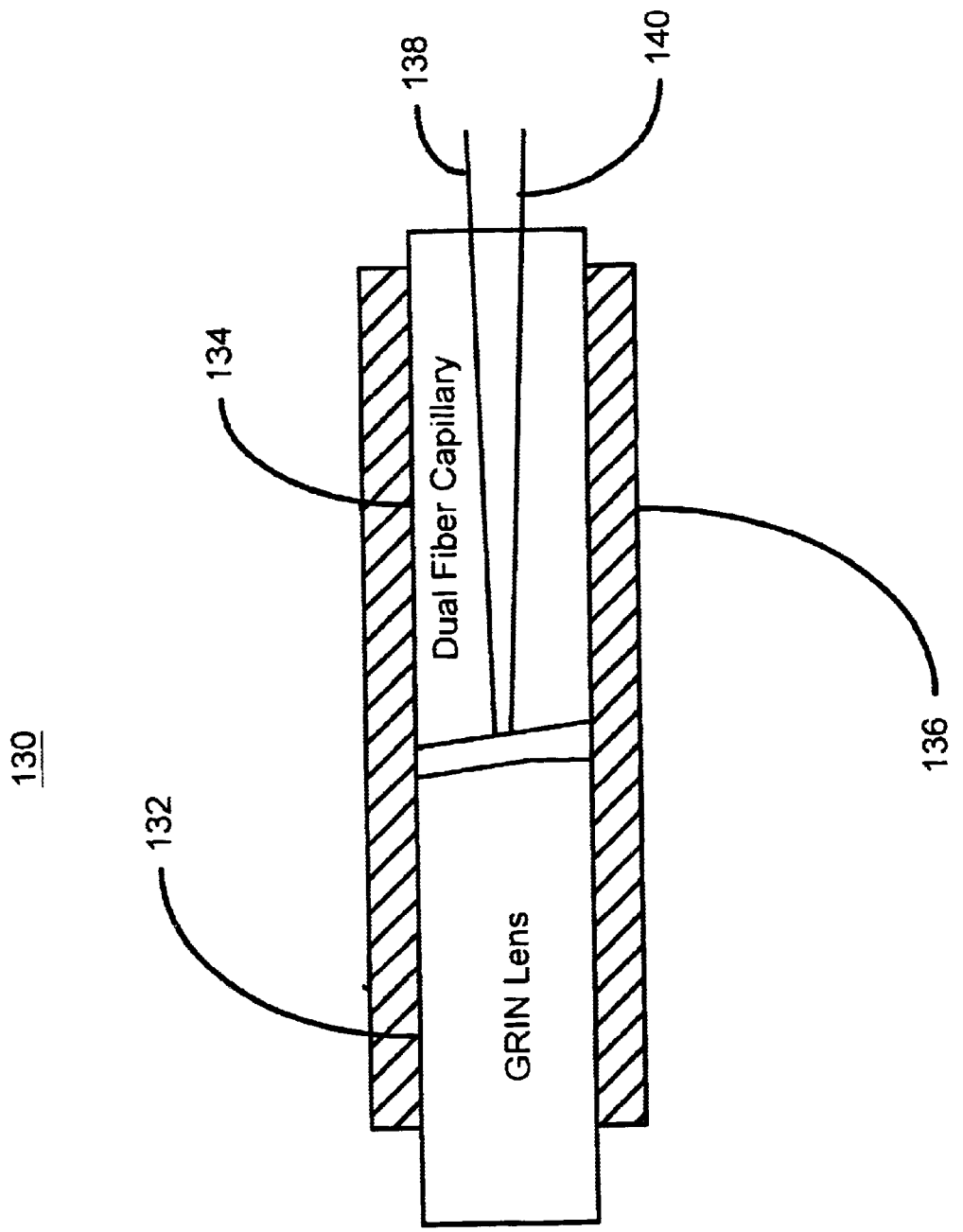
FIG. 4 is a diagram depicting a dual fiber collimator in accordance with the present invention.
Figure 5B:
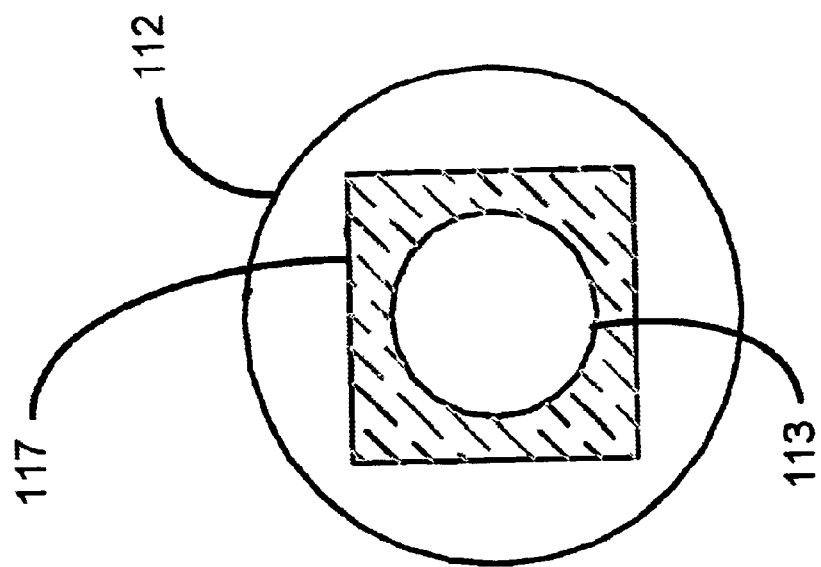
FIG. 5B is a top view of the filter and filter holder in accordance with the present invention.
Figure 5A:
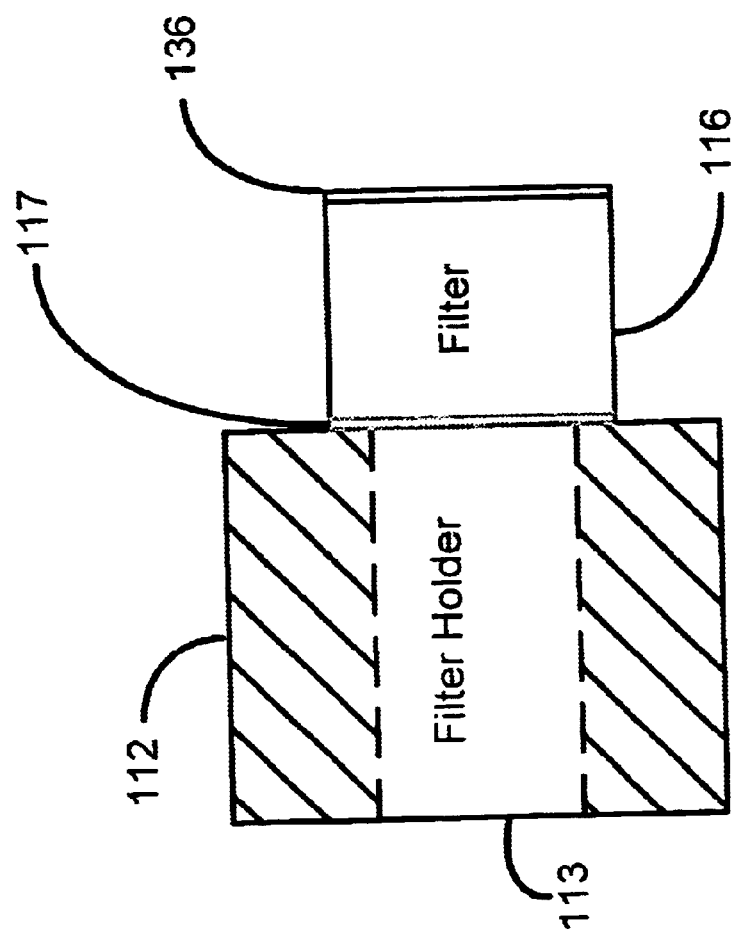
FIG. 5A is a side view of the filter and filter holder in accordance with the present invention.

FIGS. 3, 4, 5A and 5B more clearly depict embodiments of portions of the DWDM 100 in accordance with the present invention. FIG. 3 is a diagram depicting one embodiment of a DWDM unit 110 in accordance with the present invention that is capable of being used with dense optical signals. The DWDM unit 110 includes a filter holder 112, a filter 116, a dual fiber collimator 130 and a metal holder 120. The metal holder 120 is preferably tube shaped. FIG. 4 is a diagram depicting the dual fiber collimator 130 in accordance with the present invention. FIG. 5A is a side view of the filter 116 and filter holder 112 in accordance with the present invention. FIG. 5B is a top view of the filter 116 and filter holder 112 in accordance with the present invention. Referring to FIGS. 3, 4, 5A and 5B, the dual fiber collimator 130 includes a lens 132, a capillary 134 and a tube 136. The tube 136 is preferably made of glass. The lens 132 and capillary 134 are held within the tube 136. The tube 136 also preferably aligns the lens 132 and the capillary 134. The lens 132 is preferably a GRIN lens manufactured by NSG Corporation, Japan, or a C-lens manufactured by CASIX, P.R.China. The capillary 134 is a dual fiber capillary that holds fibers 138 and 140. The fibers 138 and 140 are used to provide an optical signal to the DWDM 100 and to output a portion of the optical signal that is reflected by the filter 116. The dual fiber collimator 130 is fixed within the metal tube 120, preferably using a high temperature epoxy, such as 353ND from Epoxy Technology, Inc.

Figure 6:
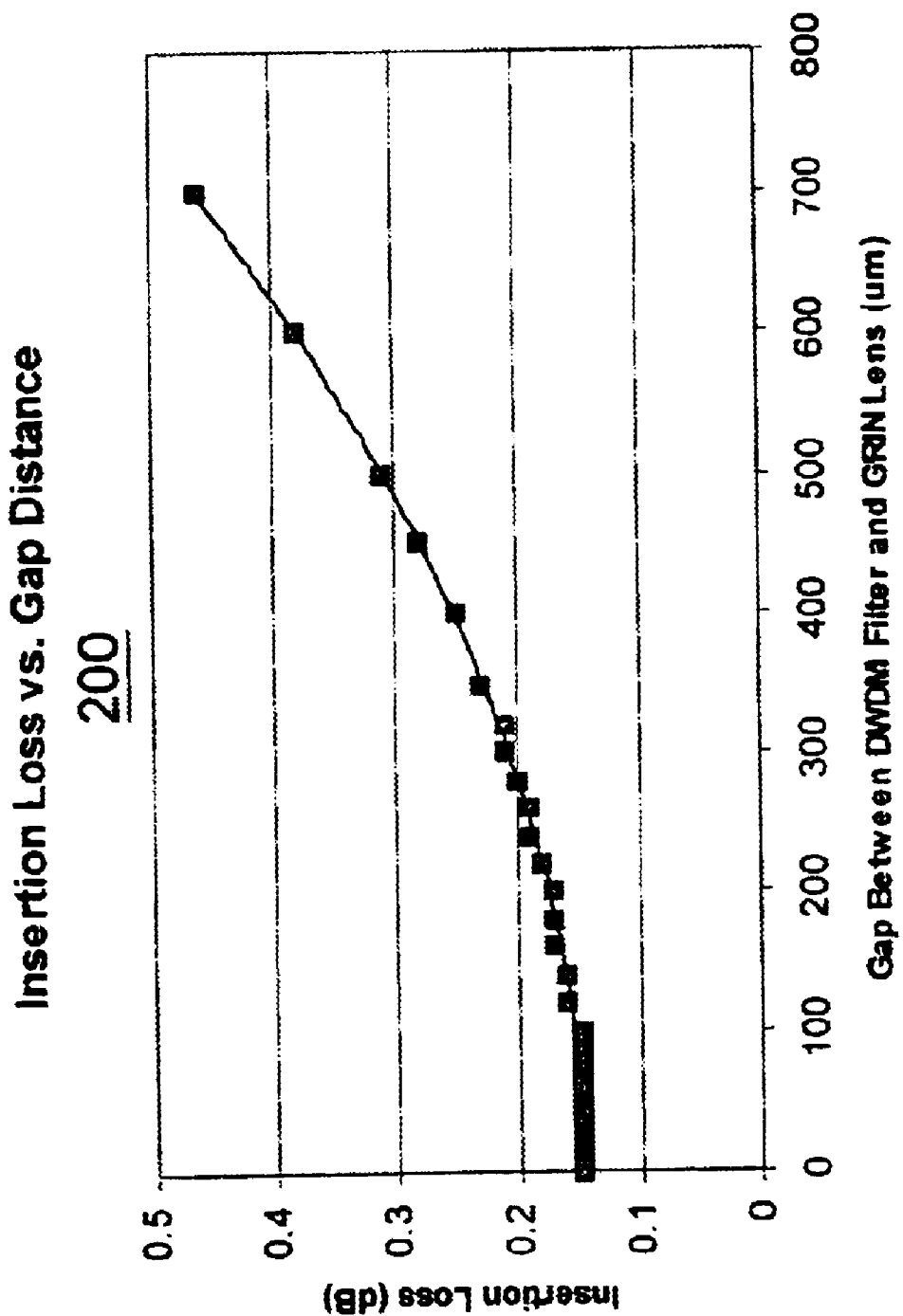
FIG. 6 is a graph depicting the insertion loss versus distance of the gap between the filter and the GRIN lens in one embodiment of a dense wavelength division multiplexer in accordance with the present invention.

The filter 116 includes a filter coating surface 118. The filter coating surface 118 is coated with multi-layer materials that can be used to filter an optical signal. The filter coating surface 118 is thus relatively close to the lens 132. When a GRIN lens is used for lens 132, the filter coating surface 118 of the filter 116 is preferably approximately 300 µm or less from back of the lens 132, where the optical signal exits the dual fiber collimator 130. FIG. 6 is a graph 200 depicting the insertion loss versus distance of the gap between the filter and the lens in one embodiment of a dens wavelength division multiplexer in accordance with the present invention. As can be seen by the graph 200, the insertion loss of the optical signal reflected by filter 116 and coupled back to fiber 140 does not appreciably increase from no gap to a gap of 300 µm between the filter 116 and the lens 132.

Referring back to FIGS. 3, 4, 5A and 5B, the filter holder 112 has an aperture 113 therein. The aperture is preferably approximately one millimeter in diameter and centered at the center of the filter holder 112. After filtering the optical signal by the filter 116, the filtered optical signal passes through the aperture 113 of the filter holder 112. In addition, the aperture 113 can be used to hold the filter holder for optical aligning between filter and dual fiber collimator in the DWDM 100. The filter holder 112 is attached to the metal holder 120 using solder 114. The filter 116 is attached to the filter holder 112 via a high temperature epoxy 117 substantially uniformly distributed in the edge area on back surface of the filter 116. The high temperature epoxy is preferably 353ND from Epoxy Technology. The back surface of the filter 116 is a surface that is opposite to the filter coating surface 118. The back surface of the filter 116 is also preferably coated with an anti-reflective material to minimize the insertion loss for the transmitted optical signals.

The DWDM 100 also includes the single fiber collimator 150, which includes a lens 160, a capillary 152 for holding a single fiber 154, a glass tube 156 and a metal tube 158. The glass tube 156 is for holding and aligning the lens 160 and the capillary 152. The metal tube allows the single fiber collimator to be soldered to the soldering tube 102.

In operation, the optical signal is provided from the dual fiber collimator 130 to the filter 116. The filter 116 filters the optical signal. The filtered optical signal is provided from the filter to the single fiber collimator 150. Because of the anti-reflective coating on the back surface of the filter 116, little of the filtered optical signal is reflected back to the dual fiber collimator 130. The filtered optical signal is transmitted to the single fiber collimator 150, then output via the fiber 154.

As discussed above, the back surface, rather than the filter coating surface 118, is used to attach the filter to the filter holder 112. As a result, the filter coating surface is not subject to stresses induced by using epoxy to hold the filter 116 in place. The coating on the filter coating surface 118 is thus not subject to mechanical stresses. As a result, the center wavelength, bandwidth and band shape of the filter 116 for optical signal with densely packed wavelengths (50 GHz and 25 GHz) are not adversely affected in the DWDM 100. Furthermore, the filter 116 will be less subject to changes in optical properties due to changes in the environment. The accuracy and stability of the filter 116 and thus the DWDM 100 are thereby improved. Furthermore, use of solder to attach the filter holder 112, the DWDM unit 110 and the single fiber collimator 150 improves the reliability of the DWDM 100. In particular, the solder used to attach the filter holder 112, the DWDM unit 110 and the single fiber collimator 150 to the soldering tube 102. Furthermore, high temperature epoxy is used in attaching the filter 116 to the filter holder 112 and to attach the dual fiber collimator 130 to the metal tube 120. This epoxy is much less subject to softening under higher temperature and/or humidity than the UV epoxy used in the conventional DWDM 10. As a result, the components within the DWDM 100 are less likely to move with respect to each other when the DWDM 100 is exposed to high temperatures and/or humidity. The critical optical alignment of the components of the DWDM 100 is thus more likely to remain as desired. The reliability of the DWDM 100 is, therefore, improved.

A method and system has been disclosed for providing a DWDM capable of being used with dense optical signals. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A dense wavelength division multiplexer comprising:
    a dual fiber collimator including a lens and a capillary, the capillary for holding a plurality of fibers;
    a filter holder having an aperture therein; and
    a filter disposed between the dual fiber collimator and the filter holder, the filter having a first surface and a second surface opposite to the first surface, the first surface being covered with a filter coating, the filter being affixed to the filter holder by the second surface;
    wherein the first surface and the filter coating are free of epoxy; and
    wherein the filter is in contact with the filter holder only along the second surface.

2. The dense wavelength division multiplexer of claim 1 wherein the lens is a graduated index of refraction (GRIN) lens or a C-lens.

3. The dense wavelength division multiplexer of claim 1 wherein the filter is affixed to the filter holder using high temperature epoxy.

4. The dense wavelength division multiplexer of claim 1 wherein the dual fiber collimator further includes a tube for holding and aligning the lens and the capillary.

5. The dense wavelength division of claim 4 further comprising a metal holder for holding the dual fiber collimator, the filter holder and the filter.

6. The dense wavelength division multiplexer of claim 5 wherein the filter holder is soldered to the metal holder.

7. The dense wavelength division multiplexer of claim 1 further comprising:
    a single fiber collimator optically coupled to the filter, the filter holder disposed between the filter and the single fiber collimator, the single fiber collimator for holding an output fiber.

8. The dense wavelength division multiplexer of claim 1 wherein the filter further includes an anti-reflective coating on the second surface of the filter.

9. A method for filtering an optical signal using a dense wavelength division multiplexer comprising:
    (a) providing an optical signal to a dual fiber collimator including a lens and a capillary, the capillary for holding a plurality of fibers;
    (b) filtering the optical signal to provide a filtered signal, the optical signal being filtered using a filter held in a filter holder having an aperture therein, the filter having a first surface and a second surface opposite to the first surface, the first surface being covered with a filter coating, the filter being affixed to the filter holder by the second surface;
    wherein the first surface and the filter coating are free of epoxy; and
    wherein the filter is in contact with the filter holder only along the second surface.

10. The method of claim 9 wherein the lens is a graduated index of refraction (GRIN) lens or a C-lens.

11. The method of claim 9 wherein the dual fiber collimator further includes a tube for holding and aligning the lens and the capillary.

12. The method of claim 9 wherein the dual fiber collimator, the filter holder and the filter are held within a metal tube.

13. The method of claim 12 wherein the filter is affixed to the filter holder using high temperature epoxy.

14. The method of claim 9 further comprising the step of:
    (c) outputting the filtered signal using an output filter held by a single fiber collimator, the filter holder disposed between the filter and the single fiber collimator.

15. The method of claim 9 wherein the filter is affixed to the filter holder using high temperature epoxy.

* * * * *